Patented Nov. 28, 1950

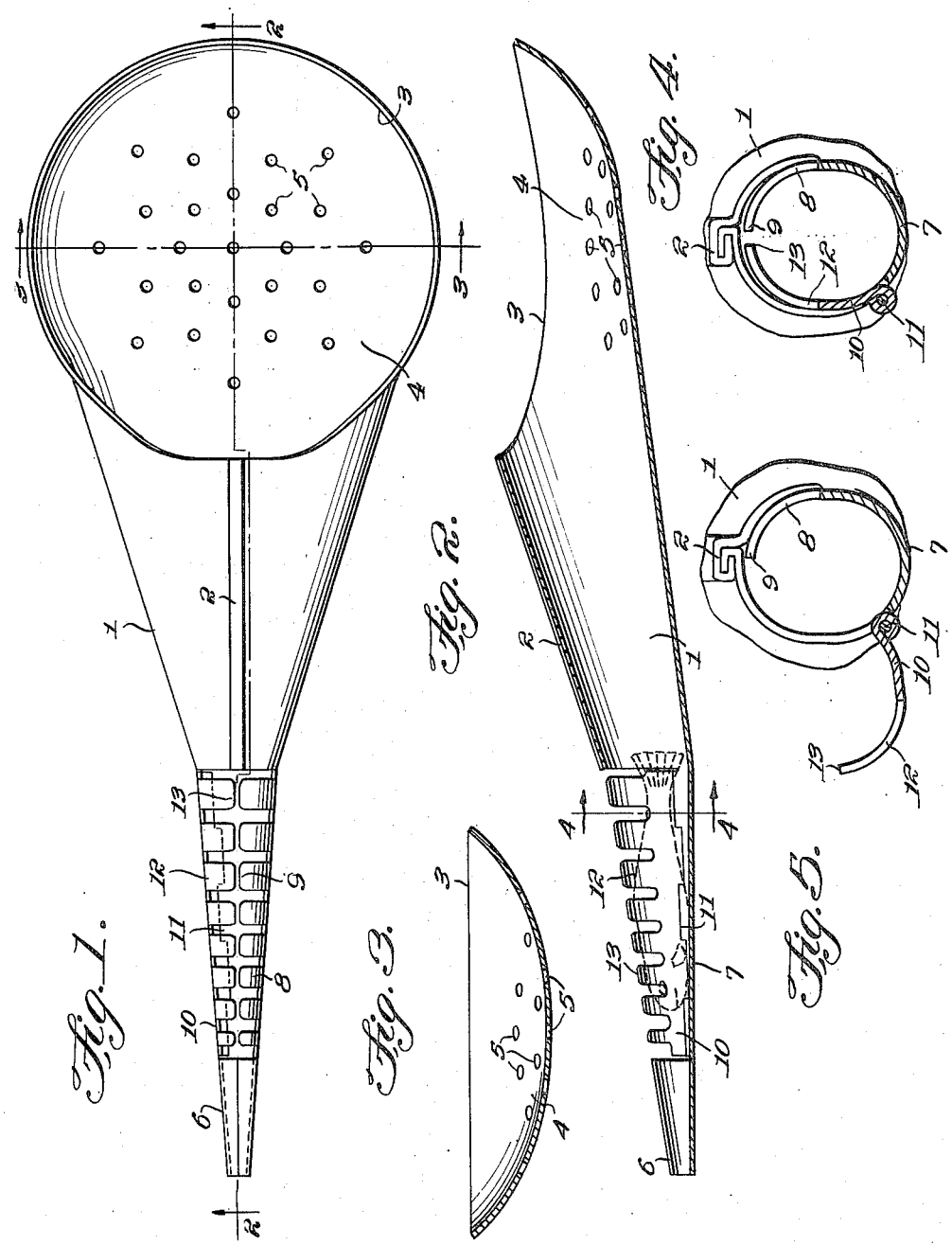

2,531,551

UNITED STATES PATENT OFFICE 2,531,551

MINNOW HOLDER

Rudolph W. Brecht and Elmer H. Meyer, Brainerd, Minn.

Application March 18, 1949, Serial No. 82,244

4 Claims. (Cl. 43—4)

The present invention relates to the general class of fishing tackle, and more specifically to an improved minnow holder for use by fishermen in baiting a fishing hook, and the primary purpose of the invention is the provision of a holder and conveyor into which a minnow may be scooped, and trapped into proper position for baiting the fishing hook, after which operations the hooked minnow may be released for fishing purposes, without necessity for actual handling of the live minnow. The minnow holder thus may be manipulated without wetting of the hands, and the hook may be baited without contact of the hands with the bait, thereby adapting the utensil or implement for winter fishing with gloved hands and in a sanitary manner.

The utensil includes a minimum number of parts that may be manufactured with facility at low cost of production and these parts may be assembled with convenience to assure a device that is sanitary and durable, and efficient in the performance of its required functions.

In the accompanying drawings we have illustrated a complete example of a physical embodiment of our invention in which the parts are combined and arranged in accord with one mode we have devised for the practical application of the principles of the invention.

The invention consists in certain novel features of construction and combinations and arrangements of the component parts as will hereinafter be described and more particularly set forth in the appended claims. Changes and alterations are contemplated and may be made in these exemplifying drawings, within the scope of our claims, without departing from the principles of the invention.

Figure 1 is a plan view of a minnow holder in which our invention is embodied; and Figure 2 is a longitudinal sectional view at line 2—2 of Fig. 1.

Figure 3 is a transverse sectional view at line 3—3 through the dipping-scoop end of the holder.

Figure 4 is a transverse sectional view at line 4—4 of Fig. 2 with the trap closed; and Figure 5 is a similar view at line 5—5 of Fig. 2 with the trap open.

The preferably conical or cone-shaped hand implement or holder 1 may be fashioned from a blank of sheet metal or other suitable material, and in this illustrated form the edges of the sheet of material are crimped as at 2 to form the tubular holder and conveyor. The larger or base end of the conical holder is fashioned with a lateral mouth or circular opening 3 to provide a dished end that forms a dipping scoop 4 that may be utilized for removing a minnow from a pail of water, and the scoop is perforated, as at 5 to permit drainage of water therefrom.

After the minnow is scooped up, the holder is tilted to convey the minnow toward the apex end of the holder, and this apex end terminates in a nozzle 6 from which water may be drained from the holder. The fishing bait slides down through the holder to a trap located adjacent the nozzle end of the holder, and while in the trap the fishing hook is engaged in the minnow.

For this purpose a portion of the wall of the tapered trap 7 is cut away or longitudinally slotted, and the opposite wall of the slotted trap is fashioned with a transversely extending series of rounded tongues 8 that form transverse slots, and these transversely arranged tongues terminate in a row of lips 9 arranged at one side of the longitudinal center of the trap.

At the opposite or recessed side of the trap, a gate 10 is mounted on hinges 11 for closing and opening the trap and the free edge of the gate is also fashioned with a series of spaced and transversely arranged tongues 12 terminating in lips 13, complementary to the tongues 8 and lips 9 of the stationary portion of the trap.

With the holder in tilted position and the trap closed, the two rows of lips 9 and 13 form a longitudinally extending slot, and when the minnow slides lengthwise into the trap it is held in position in order that the fishing hook may be inserted through this slot for engagement with the minnow preparatory to fishing. After baiting the hook, the gate is swung on its hinges to open position, and the hooked bait may be withdrawn from the open trap in desired manner.

Having thus fully described our invention, what we claim as new and desire to secure by Letters Patent is:

1. A cone-shaped holder and conveyor for live bait having a lateral opening forming a dipping-scoop at its base end and terminating in a tapered nozzle at its apex end, and a trap intermediate its dipping-scoop and nozzle, said trap having a plurality of transversely arranged tongues with the free ends of the tongues forming a plurality of longitudinally extending slots to permit insertion of a fishing hook.

2. A cone-shaped holder and conveyor for minnows having a lateral opening forming a perforated dipping-scoop at its base and terminating in a tapered nozzle at its apex end, and a trap having a hinged gate and located adjacent the nozzle, said trap and gate having a plurality of transversely arranged tongues and the free ends of the tongues forming a plurality of longitudinally extending slots to permit insertion of a fishing hook.

3. A cone-shaped holder and conveyor for minnows having a dipping-scoop at its base-end and terminating in a nozzle at its apex-end, said holder having a lateral opening adjacent the nozzle and longitudinally spaced transversely arranged tongues rigid with one edge of the wall of said opening, a gate hinged to the opposite edge of the wall of the opening, longitudinally spaced and transversely arranged tongues rigid with the gate, the opposed free ends of the tongues forming a plurality of longitudinally extending slots to permit the insertion of a fishing hook.

4. A holder and conveyor for minnows having an open dipper scoop at one end and a draining nozzle at its opposite end, said holder having a lateral opening adjacent the nozzle, and a hinged gate mounted on one edge of the wall of the opening so that the free edge of the gate coacts with the opposite edge of the wall of the opening, and the opposite edge of the opening and the free edge of the gate having a series of transversely extending tongues forming a plurality of longitudinally extending slots to permit the insertion of a fishing hook.

RUDOLPH W. BRECHT.
ELMER H. MEYER.

REFERENCES CITED

The following references are of record in the file of this patent:

UNITED STATES PATENTS

| Number | Name | Date |
|---|---|---|
| 220,576 | Chilis | Oct. 14, 1879 |
| 2,054,265 | Muguerditchian | Sept. 15, 1936 |